United States Patent
McCarthy et al.

(10) Patent No.: US 9,766,803 B2
(45) Date of Patent: Sep. 19, 2017

(54) MOBILE DEVICE CAMERA VIEWFINDER PUNCH THROUGH EFFECT

(71) Applicant: Futurewei Technologies, Inc., Plano, TX (US)

(72) Inventors: Robert McCarthy, Escondido, CA (US); Anthony Mazzola, Ramona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/985,814

(22) Filed: Dec. 31, 2015

(65) Prior Publication Data
US 2017/0192666 A1    Jul. 6, 2017

(51) Int. Cl.
*H04N 5/232*    (2006.01)
*G06F 3/0488*   (2013.01)
*G06F 3/0482*   (2013.01)

(52) U.S. Cl.
CPC ........ *G06F 3/04883* (2013.01); *G06F 3/0482* (2013.01); *H04N 5/23216* (2013.01); *H04N 5/23293* (2013.01)

(58) Field of Classification Search
CPC .............. G06F 3/04883; G06F 3/0482; H04N 5/23216; H04N 5/23293; H04M 1/72552; H04M 1/72555
See application file for complete search history.

(56) References Cited

U.S. PATENT DOCUMENTS

| | | | |
|---|---|---|---|
| 2014/0085487 A1* | 3/2014 | Park | G06F 3/04883 348/207.1 |
| 2016/0261790 A1* | 9/2016 | Lee | H04L 51/32 |
| 2016/0266783 A1* | 9/2016 | Lee | G06Q 10/107 |

* cited by examiner

*Primary Examiner* — Nicholas Giles
(74) *Attorney, Agent, or Firm* — Schwegman Lundberg & Woessner, P.A.

(57) ABSTRACT

In an example embodiment, an application is executed on a mobile device, causing generation of application graphical output in an application layer. The application layer is rendered on a touchscreen display. A first gesture of a user is detected, and in response to the first gesture a viewfinder layer is generated, the viewfinder layer containing real-time image data from the embedded camera via a camera service. A composite of the application layer, the viewfinder layer, and a transparency mask is rendered so that a portion of the viewfinder layer is visible and a portion of the application layer is visible on the touchscreen display at the same time. Then a second gesture by the user is detected, and in response to the second gesture, viewfinder data from the viewfinder layer is captured and the viewfinder layer and transparency mask are removed.

20 Claims, 9 Drawing Sheets

MOBILE DEVICE CAMERA VIEWFINDER PUNCH THROUGH EFFECT

TECHNICAL FIELD

The present disclosure relates to user interfaces on mobile devices. More particularly, the present disclosure relates to a mobile device camera viewfinder punch through effect.

BACKGROUND

Many mobile devices, such as smartphones and tablet computers, now come with an embedded camera that can be used to take pictures and/or record video. The camera is typically controlled via a dedicated camera application installed on the mobile device. In first generation mobile devices, users typically had to navigate to and open the camera application, in the same way as navigating to and opening up any other application on the device, in order to take a picture. This typically involved exiting whatever application the mobile device was currently executing, locating the camera application within the application directory/home page of the mobile device, and launching the camera application.

In recent generations of mobile devices, manufacturers have realized just how often users take photos or record videos and have taken steps to make it easier for the user to launch the camera application. This includes, for example, providing the ability for the user to launch the camera application while currently executing a different application by bringing up a navigation screen such as a control center by executing a particular gesture. The navigation screen has an icon to quick launch the camera application. This gives the user the impression that the camera application is launching from inside the currently running application, but in reality the operating system saves the state of the currently running application and stops running it while the camera application is launched and run, and then reloads and restarts the application once the camera application has been closed.

While the above process is quicker than in first generation mobile devices, it is still too slow for many users. Oftentimes, an interesting photo is missed due to the user being unable to perform the gestures necessary to launch the camera application in time. Additionally, the launching of the camera application, even when started quickly, itself takes time to complete. As such, even if a user has lightning-fast reflexes and takes only fractions of a second to select to launch the camera application, it may take a few seconds for the camera application to completely launch to allow the user to take pictures or record video.

SUMMARY

In a first example embodiment, a mobile device is provided comprising: a central processing unit; a memory; an embedded camera; a touchscreen display; the central processing unit configured to: execute an application, causing generation of application graphical output in an application layer; cause rendering of the application layer on the touchscreen display; detect a first gesture by a user of the mobile device; in response to detecting the first gesture, generate a viewfinder layer, the viewfinder layer containing real-time image data from the embedded camera via a camera service; cause rendering of a composite of the application layer, the viewfinder layer, and a transparency mask so that a portion of the viewfinder layer is visible and a portion of the application layer is visible on the touchscreen display at the same time; detect a second gesture by the user of the mobile device; and in response to detecting the second gesture, capture viewfinder data from the viewfinder layer and remove the viewfinder layer and transparency mask rendering the application layer on the touchscreen display without the viewfinder layer or transparency mask.

In a second example embodiment, a method is provided comprising: executing an application on a mobile device, causing generation of application graphical output in an application layer; causing rendering of the application layer on a touchscreen display of the mobile device; detecting a first gesture by a user of the mobile device; in response to the detecting a first gesture, generating a viewfinder layer, the viewfinder layer containing real-time image data from the embedded camera via a camera service; causing rendering of a composite of the application layer, the viewfinder layer, and a transparency mask so that a portion of the viewfinder layer is visible and a portion of the application layer is visible on the touchscreen display at the same time; detecting a second gesture by the user of the mobile device; and in response to the detecting of the second gesture, capturing viewfinder data from the viewfinder layer and removing the viewfinder layer and transparency mask rendering the application layer on the touchscreen display without the viewfinder layer or transparency mask.

In a third example embodiment, a non-transitory computer-readable storage medium is provided comprising instructions that, when executed by at least one processor of a machine, cause the machine to perform operations comprising: executing an application on a mobile device, causing generation of application graphical output in an application layer; causing rendering of the application layer on a touchscreen display of the mobile device; detecting a first gesture by a user of the mobile device; in response to the detecting a first gesture, generating a viewfinder layer, the viewfinder layer containing real-time image data from the embedded camera via a camera service; causing rendering of a composite of the application layer, the viewfinder layer, and a transparency mask so that a portion of the viewfinder layer is visible and a portion of the application layer is visible on the touchscreen display at the same time; detecting a second gesture by the user of the mobile device; and in response to the detecting of the second gesture, capturing viewfinder data from the viewfinder layer and removing the viewfinder layer and transparency mask rendering the application layer on the touchscreen display without the viewfinder layer or transparency mask.

DETAILED DESCRIPTION

Figure 1:
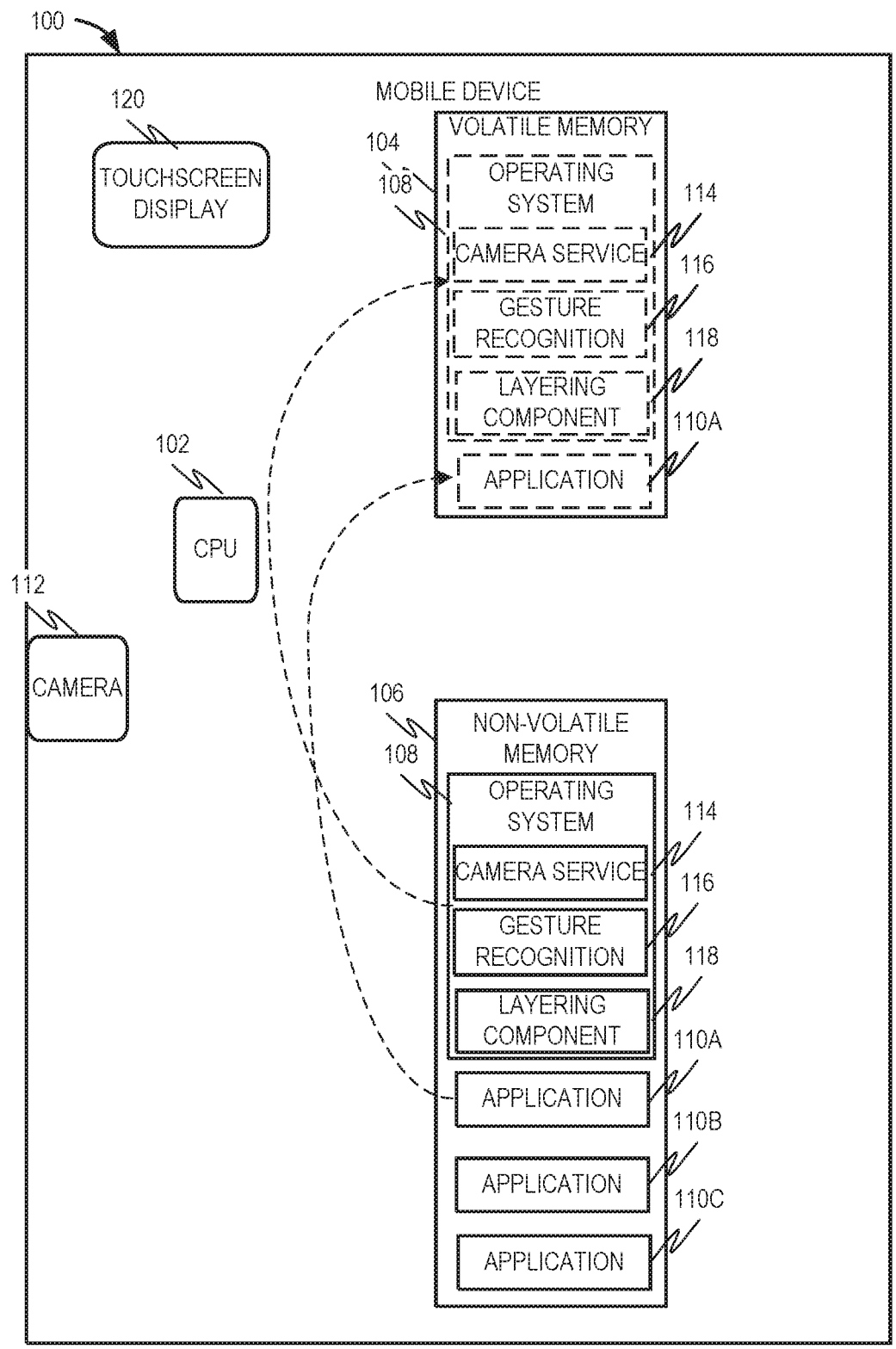
FIG. 1 is a block diagram illustrating a mobile device in accordance with an example embodiment.

In the following description, reference is made to the accompanying drawings, which form a part hereof, and in which are shown, by way of illustration, specific embodiments which may be practiced. These embodiments are described in sufficient detail to enable those skilled in the art to practice the subject matter disclosed herein, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software or a combination of software and human-implemented procedures in one embodiment. The software may consist of computer-executable instructions stored on computer-readable media or a computer-readable storage device such as one or more non-transitory memories or other types of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer, server, or other computer system.

In an example embodiment, a "punch through" effect is provided for applications running on a mobile device. A single gesture or other command causes an overlay effect to occur that makes it appear as if a viewfinder is appearing underneath the display of the currently executing application. A "hole" appears in the display of the currently executing application to reveal the viewfinder, which the user can use to take a photograph or record a video, while the rest of the display shows the other areas of the currently executed application's display. Once this process is complete, the hole may disappear, returning the display completely to the currently executed application.

In an example embodiment, the punch through effect is accomplished by designing the camera functionality to execute as a service rather than as a separate application. This allows the camera to be accessed in the background while another application is running, without the need to launch a separate camera application. Three screen layers are used to visually display the punch through effect. An application layer is always visible and displays the graphical output of the currently running application. A viewfinder layer displays real-time footage of the images captured by the camera service, but is not composed until the user indicates that a photo is desired (such as, for example, by using a specific gesture or button). A transparency mask is then overlaid on top of the application layer and the viewfinder layer to expose a portion of the viewfinder layer, thus allowing the user to see what image is being captured. The transparency mask may allow a screen display to present a portion of the application layer and a portion of the viewfinder layer in different areas of the screen display. In other words, the portion of the application layer and the portion of the viewfinder layer may be separately visible at the same time for a user accessing the screen display. Another command or gesture may cause the camera service to capture an image, and then the user can return to the currently running application.

In an example embodiment, there is no duty cycle for running the camera hardware. The camera hardware remains off and is only turned on when the user triggers the taking of a photograph. After the photo is taken, the camera may be turned off. Additionally, since the viewfinder layer is only composed when the user action deliberately brings up the effect, there is no additional power usage.

FIG. 1 is a block diagram illustrating a mobile device 100, in accordance with an example embodiment. The mobile device 100 may include a central processing unit (CPU) 102, a volatile memory 104, and a non-volatile memory 106. The non-volatile memory 106 may store computer code, including, for example, operating system 108 and one or more applications 110A-110C. In an example embodiment, CPU 102 may be implemented as a central processing unit means, volatile memory 104 may be implemented as a volatile memory 104 means, and non-volatile memory 106 may be implemented as a non-volatile memory 106 means. Notably, while only three applications 110A-110C are pictured here, in many instances, users would install a large number of applications 110A-110C in the non-volatile memory 106. When the mobile device 100 is powered on, the operating system 108 is obtained from the non-volatile memory 106 and stored in volatile memory 104, such as random access memory (RAM), which allows for greater access speeds than the non-volatile memory 106. The CPU 102 then can process operations from the operating system 108 directly from the faster volatile memory 104.

Each application 110A-110C may be implemented as an application means and the operating system 108 may be implemented as an operating system 108 means.

As the user interacts with the mobile device 100, he or she may launch one of the applications 110A-110C, which causes the corresponding application (e.g., application 110A) to be stored in the volatile memory 104 for execution. Multitasking allows for multiple applications 110A-110C to be run simultaneously, and thus multiple applications 110A-110C may be stored in the volatile memory 104 at the same time.

One or more cameras 112 may also be contained on the mobile device 100. Each camera 112 may be implemented as a camera 112 means. These cameras 112 may act to capture images and/or video viewed through a lens of the one or more cameras 112. The internal electronics and architecture of these cameras 112 are beyond the scope of this disclosure, but one of ordinary skill in the art will recognize that there are many different types of cameras 112 and placement locations for the cameras 112 that may be used. It is common, for example, for a mobile device 100 to have one camera 112 placed on a back side of the mobile device 100, to allow the user to take images and video of scenes behind the mobile device 100 while the user holds the mobile device 100 upwards at eye level and views a viewfinder on a display of the mobile device 100. It is also common, for example, for the mobile device 100 to have an additional camera 112 placed on a front side of the mobile device 100, to allow the user to take images of him or herself and/or any scenes behind the user as the user holds the mobile device 100 upwards at eye level.

As described in the background section, it is common for mobile devices 100 to use camera applications to control the viewing and taking of images and/or video from embedded cameras 112. As such, in the prior art, a user would need to launch a camera application to engage in operations with the camera 112, which would involve loading the camera application from the non-volatile memory 106 to the volatile memory 104 for execution. This loading process, however, takes time, processing cycles, and power. In an example embodiment, the operating system 108 is designed with an embedded camera service 114 that is always active (or at least accessible) whenever the operating system 108 is operating. The camera service 114 may be implemented as a camera service 114 means. A gesture recognition component 116 acts to recognize one or more gestures, or other user input, on a touchscreen display 120 and, in response to the one or more gestures or other user input, launch the camera service 114. The gesture recognition component 116 may be implemented as a gesture recognition means. Additionally, a layering component 118 acts to render display output from the currently running application 110A as an application layer, render display output from the camera service 114 in a viewfinder layer, and apply a transparency mask to the application layer and viewfinder layer to create a punch through effect in the displayable output sent to the touchscreen display 120 for display to the user. The layering component 118 is a component in the mobile device 102 that is designed to render graphics on the touchscreen display 120 by rendering layers of graphical information one on top of another. In some example embodiments, this layering component 118 may be part of the operating system 108. In other example embodiments, the layering component 118 may be built into a separate graphical processing unit (GPU)(not pictured) in the mobile device 118. By utilizing the layering component 118, which is already designed to render graphics in layers, to produce the punch-through effect, the desired effect may be accomplished without requiring that a separate application perform additional calculations or operations to create a composite image from the graphical output of the application 110A and the camera service 114. This allows the mobile device 118 to product the punch-through effect while rendering both the output from the application 110A and the output from the camera service 114 in real time. The layering component 118 may be implemented as a layering component 118 means. The touchscreen display 120 may be implemented a touchscreen display 120 means.

Notably, both the application 110A and the camera service 114 continue to run as full screen processes, it is just that portions of the graphical output of either are not visible on the touchscreen 120. Thus, only a portion of the application layer may be visible when the punch through effect is displayed, but the application 110A continues to operate normally despite this partial lack of visibility. Likewise, the viewfinder layer continues to operate normally even though a portion of the viewfinder layer is obscured by the application layer.

Figure 2:
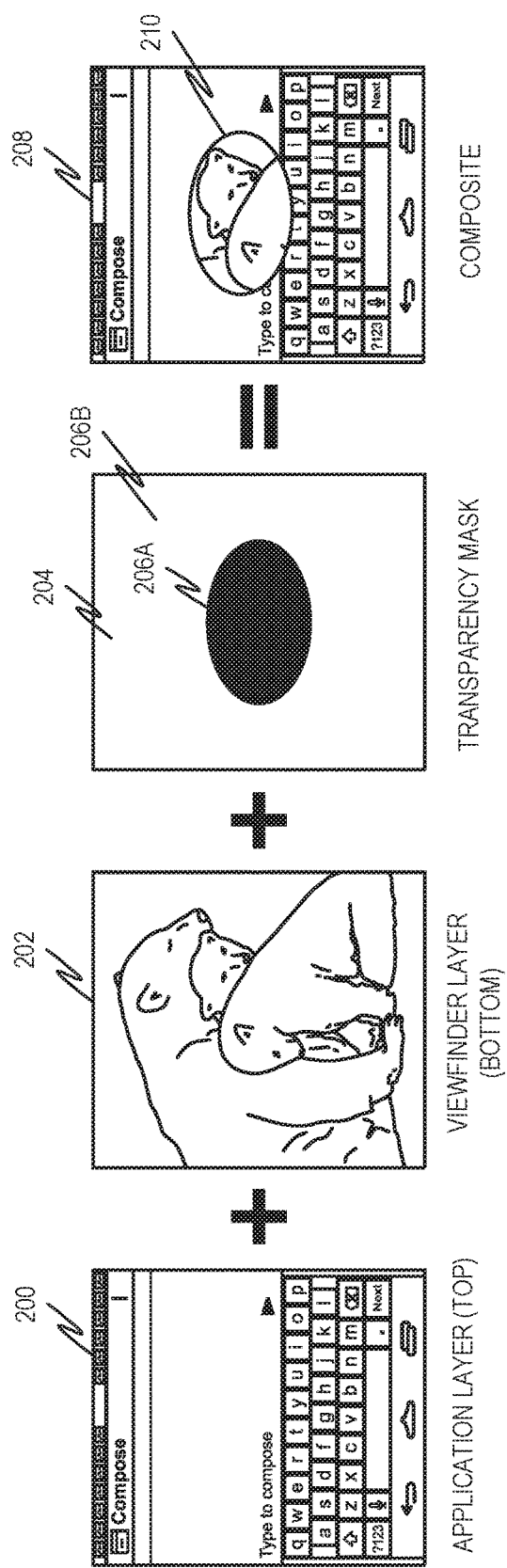
FIG. 2 is a diagram illustrating layering performed by a layering component in accordance with an example embodiment.

FIG. 2 is a diagram illustrating layering performed by a layering component 118 in accordance with an example embodiment. As can be seen, an application layer 200 shows graphical output from an application 110A, here a text messaging program. A viewfinder layer 202 shows graphical output from a camera service 114, here the live view from a camera 112 on the back of the mobile device 100. Being a live feed, this viewfinder layer 202 may be constantly changing as the scene captured by the camera 112 changes (from, e.g., movement of the subjects of the images, movement of the mobile device 100, or operations performed in the camera service 114 (e.g., zooming in). Likewise, the application layer 200 may also be changing, as interaction with the application layer 200 by the user may continue even as the punch through effect is displayed, and additionally, the application 110A may update its own graphical output without user input (e.g., if the application 110A is a video player and the video continues to play while the punch through effect is displayed).

A transparency mask 204 is also rendered. In an example embodiment, the transparency mask 204 has two areas—a transparent area 206A and an opaque area 206B. This transparency mask 204 may be constructed based on whether the application layer 200 is on top of the viewfinder layer 202 or vice versa. In FIG. 2, the viewfinder layer 202 is below the application layer 200, and thus, to create the punch through effect, the transparent area 206A is a circle, oval, or other shape such as a polygon, while the area around the transparent area 206A is an opaque area 206B. This transparency mask 204, therefore, has the effect of causing a "hole" to appear in the application layer 200 where the transparent area 206A is located, allowing the underlying viewfinder layer 202 in that transparent area 206A to be seen. This is seen in composite image 208, where the punch through area 210 depicts the area of the viewfinder layer 202 in the transparent area 206A area.

Figure 3:
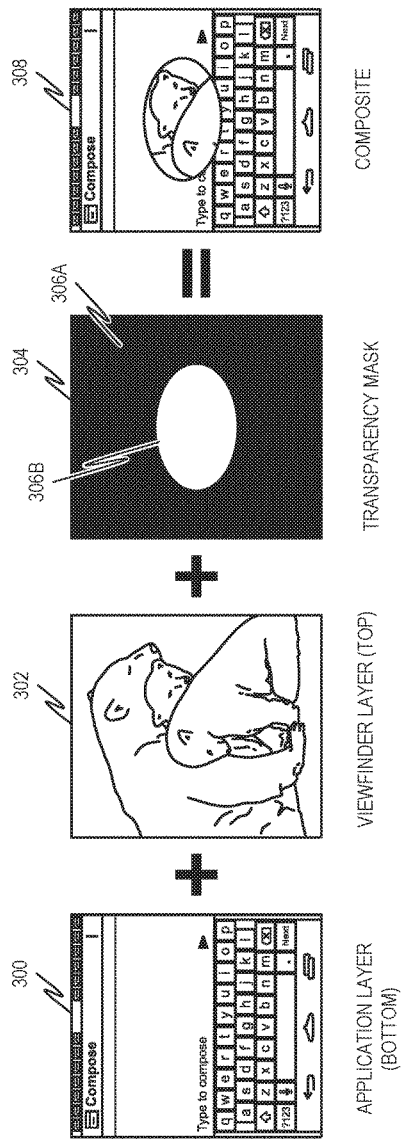
FIG. 3 is a diagram illustrating layering performing by a layering component in accordance with an alternative example embodiment.

FIG. 3 is a diagram illustrating layering performed by a layering component 118 in accordance with an alternative example embodiment. Here, the application layer 300 is below the viewfinder layer 302. Thus, the transparency mask 304 is inverted from transparency mask 204 of FIG. 2, with an opaque area 306B corresponding to transparent area 206A and the area around the opaque area 306B being the transparent area 306A. This transparency mask 304 actually causes the same punch through effect in composite image 308 as seen in composite image 208 of FIG. 2, due to the inversion of both the ordering of the application layer 300 and viewfinder layer 302 and the transparency mask 304.

Figure 4:
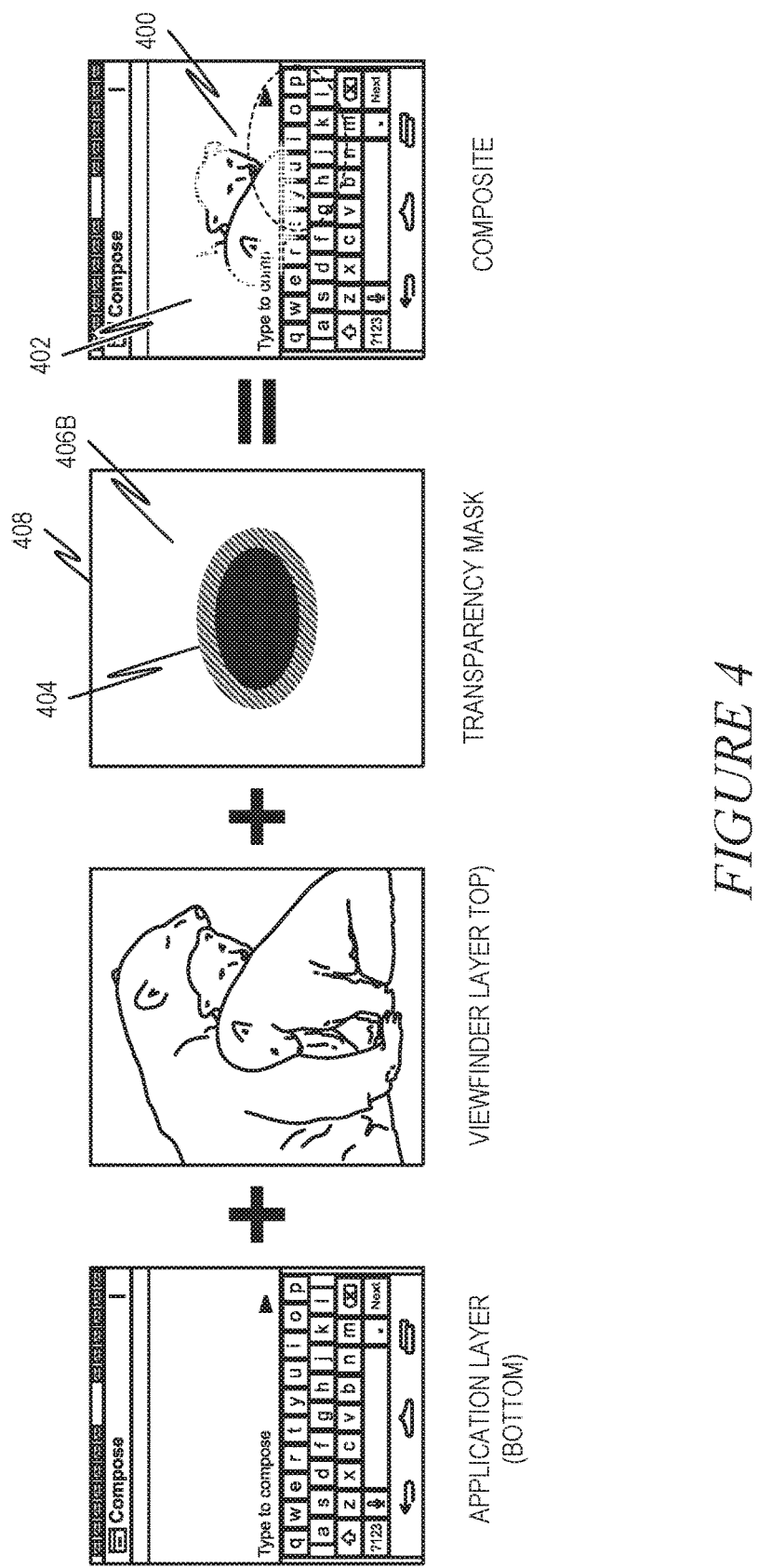
FIG. 4 depicts layering performed by a layering component in accordance with another alternative example embodiment.

It should be noted that, while the above depicts and describes embodiments where the transparency mask 204, 304 has only binary values (opaque vs. transparent), embodiments are foreseen where transparency levels can be varied by different degrees to provide different visual effects. An example of this is depicted in FIG. 4, which depicts layering performed by a layering component 118 in accordance with another alternative example embodiment. Here, the dividing line between the punch through effect 400 and the surrounding application area 402 is softened by creating a bordering area 404 of the opaque area 406B of the transparency mask 408. This bordering area 404 contains values that are between that of completely opaque and completely transparent, leading to various degrees of partial transparency, to create a sort of "soft focus" effect at the transition. Indeed, in some example embodiments, concentric circles of borders may be placed at the edge of the opaque area 406B of the transparency mask 408, with each concentric circle being more and more transparent as they continue away from the opaque area 406B (or more and more opaque in the case where the circle is a transparent area 404).

Figure 5:
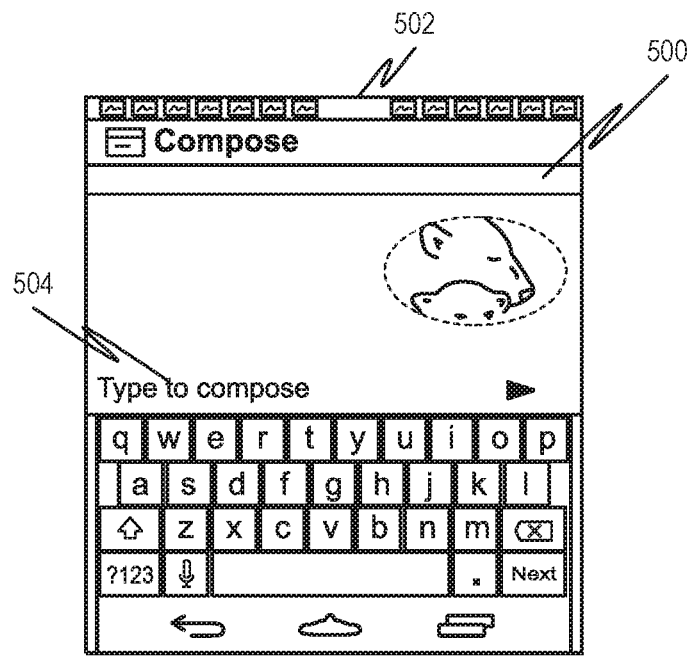
FIG. 5 is a screen capture illustrating a moved punch through effect in accordance with an example embodiment.

Once the punch through effect is visible on the screen, various operations may be used in response to one or more user gestures and/or other input to alter the punch through effect. For example, the user can act to move the punch through effect around the display, enlarge or shrink the punch through effect, or cause the taking of a picture or video. FIG. 5 is a screen capture illustrating a moved punch through effect, in accordance with an example embodiment. Here, the user has moved the punch through area 500 by pressing his or her finger on the punch through area 500 and dragging it to a different location on the display 502. This may be useful in cases where, for example, the punch through effect is blocking an area 500 of the underlying application layer 300 that is important to see. Here, for example, the punch through area 500 has been moved to reveal an area 504 where the user can type to compose a text message. That area 504 may have been blocked by a previous location of the punch through area 500, such as that depicted in FIG. 4. As will be seen, this becomes relevant because the user is able to interact with the underlying currently running application 110A that is generating the graphical output of the application layer 300 even while the punch through area 500 remains on the screen. In FIG. 5, for example, the user may press on the area 504 to type a message even while punch through area 500 remains displayed and showing images captured in real-time by a camera 112.

The moving of the punch through area 500 is detected by a gesture recognition component 116 which then causes a layering component 118 to alter the transparency mask 408 to move the circle (whether it be opaque or transparent) to a different location.

Figure 6:
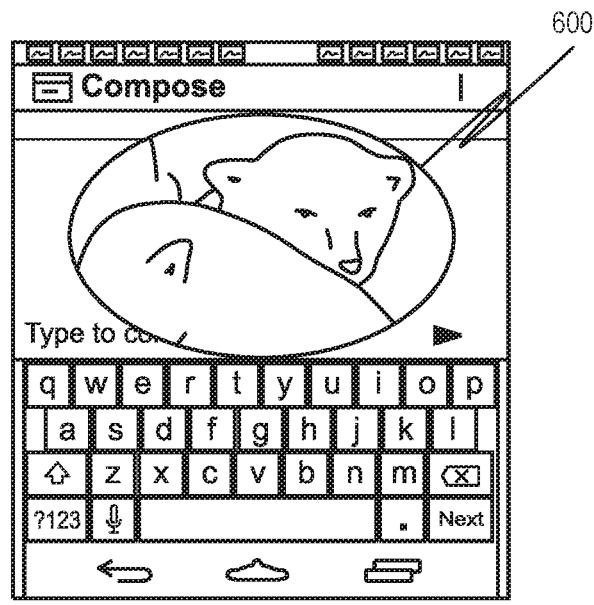
FIG. 6 is a screen capture illustrating an enlarged punch through effect in accordance with an example embodiment.

FIG. 6 is a screen capture illustrating an enlarged punch through effect, in accordance with an example embodiment. Here, the user has performed a pinch gesture to enlarge the punch through area 600 by, for example, pressing an index finger and thumb on the punch through area 600 and spreading the index finger and thumb away from each other prior to removing them from the touchscreen display 120. The result is that the punch through area 600 has been enlarged. This gesture may be detected by a gesture recognition component 116 which then causes a layering component 118 to alter the transparency mask 408 to enlarge the circle Taking of a picture or video may be activated by another gesture on the punch through area 600. For example, an image may be captured using a single finger tap on the punch through area 600. A video may be recorded by holding a finger on the punch through area 600 for a predetermined period of time (e.g., 1 second or more).

While the above describes specific gestures that can be used for different operations, any gesture can be assigned to any of these operations. In an example embodiment, a mapping between gestures and operations may be maintained by the operating system 108. In some example embodiments, the user may be able to modify the mapping to create custom gesture/operation pairs. In some example embodiments, it may be beneficial to limit the gestures used for operations on an already-displayed punch through area to only gestures that interact with the punch through area, e.g., only gestures where the user touches the punch through area, to help distinguish between gestures intended to alter or interact with the punch through area versus gestures intended to alter or interact with the currently running underlying application 110A. For example, a single tap on the punch through area may indicate a picture should be taken, while a single tape on a location outside the punch through area may indicate an interaction with the currently running underlying application 110A (such as placement of a cursor for typing).

In an example embodiment, care may be taken in selecting a gesture or gestures used to launch the punch through effect (i.e., launch the camera service 114), as it may be useful to assign a gesture that is not used for the currently running underlying application 110A. For example, a double tap on an area of the screen may be too commonly used of a gesture for various applications 110A-110C to assign to launching of the camera service 114 as the operating system 108 may not be able to tell the difference between the user double tapping to interact with the application 110A versus double tapping to launch the camera service 114. Thus, in an example embodiment, it may be beneficial to assign a "unique" gesture to the launching of the camera service 114, a "unique" gesture being one that is not used by any of the applications 110A-110C, or at least not used by a significant majority of those applications 110A-110C. Examples of such gestures include force touch (on mobile devices 100 able to detect the amount of pressure the user is applying, the detection of pressure applied beyond a particular threshold), double tapping of a power or other physical button, a double knuckle gesture (similar to knocking on a door), etc.

Figure 7:
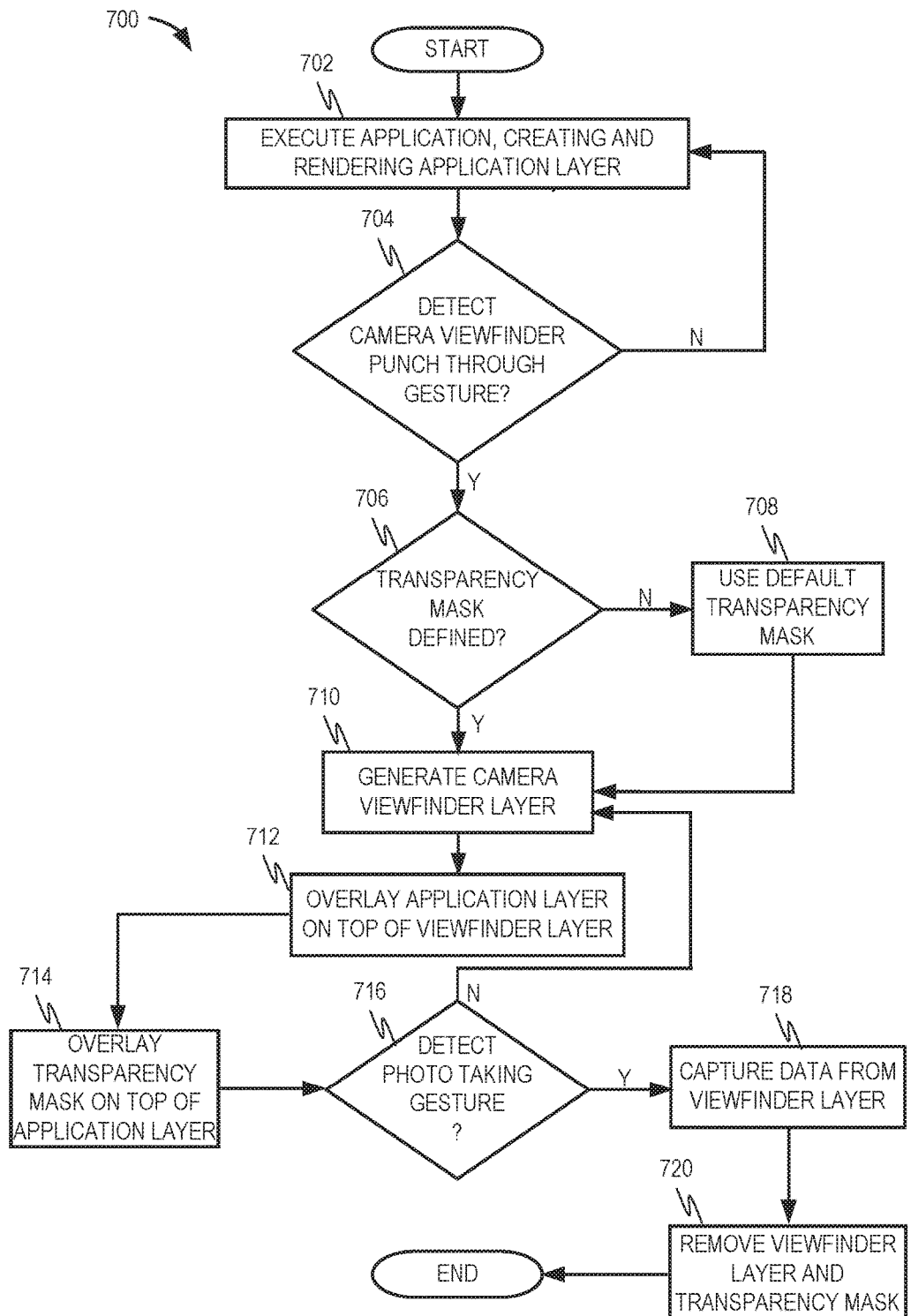
FIG. 7 is a flow diagram illustrating a method for creating a punch through effect on a mobile device, in accordance with an example embodiment.

FIG. 7 is a flow diagram illustrating a method 700 for creating a punch through effect on a mobile device 100, in accordance with an example embodiment. The method 700 may be performed, for example, by an operating system 108 of the mobile device 100. At operation 702, an application 110A is executed, causing creation of and rendering of an application layer 300. This application layer 300 displays any graphical output from the application 110A as well as provides a user interface area for a user of the mobile device 100 to interact with the application 110A, for example through a touchscreen.

At operation 704, it is determined if a camera viewfinder punch through gesture is detected by the operating system 108. As described above, this gesture may be any gesture defined as corresponding to launching of a camera viewfinder punch through effect, including, for example, force touch, double tap of a power button, or double knuckle gesture. The process loops until a camera viewfinder punch through gesture is detected at which point, at operation 706, it is determined if a transparency mask 408 is defined. If not, then at operation 708, a default transparency mask 408 is used. If a transparency mask 408 is already defined, the previously defined transparency mask 408 can be used. This allows, for example, modifications made to the transparency layer by the user (such as moving the punch through area or enlarging the punch through area) to be reused, eliminating the need for the user to make the same modifications again.

At operation 710, a camera viewfinder layer 302 is generated. This may include creating a camera viewfinder layer 302 and linking the camera viewfinder layer 302 to a camera service 114 operating on the mobile device 100, the camera service 114 linked to a camera 112 on the mobile device 100. The viewfinder layer 302 shows a real-time view of whatever the camera 112 is capturing.

At operation 712, the application layer 300 may be overlaid on top of the viewfinder layer 302. As described earlier, in some embodiments, the viewfinder layer 302 may actually be overlaid on top of the application layer 300, in which case the transparency mask 408 may be inverted. At operation 714, the transparency mask 408 is overlaid on top of the application layer 300 (or in the alternative embodiment, the viewfinder layer 302), causing the punch through effect to reveal a portion of the viewfinder layer 302 as appearing underneath a hole in the application layer 300.

At operation 716, it is determined if a gesture to take a photo is detected. If not, then the process loops back to 710, and this loop continues to update the viewfinder layer 302 and application layer 300 until the gesture to take the photo is detected. This may include, for example, permitting interaction between the user and the portion of the application layer 300 that is visible, as well as interaction between the user and the portion of the viewfinder layer 302 that is visible.

Once a gesture to take a photo is detected, at operation 718, data (e.g., the image) from the viewfinder layer 302 is captured. This includes the entire image displayed in the viewfinder layer 302, not merely the portion of the image displayed in the punch through effect. At operation 720, the viewfinder layer 302 and transparency mask 408 are removed, thus rendering the application layer 300 without the viewfinder layer 302 or transparency mask 408, effectively making it appear as if just the application 110A alone is running and not the camera service 114, even though the camera service 114 may continue to operate in the background.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application 110A or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device 100, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 8:
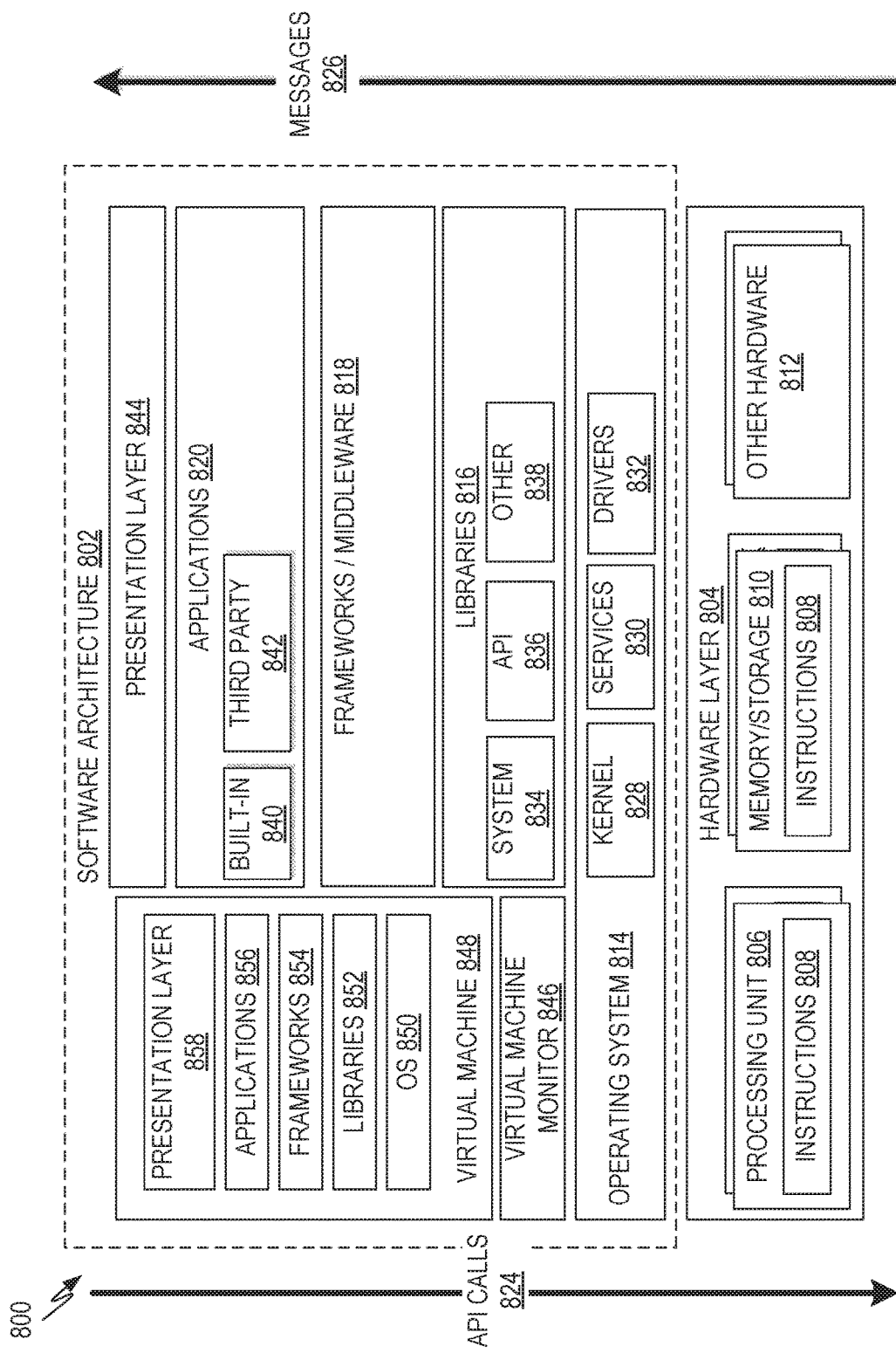
FIG. 8 is a block diagram illustrating a representative software architecture, which may be used in conjunction with various hardware architectures herein described.

FIG. 8 is a block diagram 800 illustrating a representative software architecture 802, which may be used in conjunction with various hardware architectures herein described. FIG. 8 is merely a non-limiting example of a software architecture 802 and it will be appreciated that many other architectures may be implemented to facilitate the functionality described herein. The software architecture 802 may be executing on hardware such as machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. Executable instructions 808 represent the executable instructions of the software architecture 802, including implementation of the methods, modules and so forth of FIGS. 1-7. Hardware layer 804 also includes memory and/or storage modules 810, which also have executable instructions 808. Hardware layer 804 may also comprise other hardware 812, which represents any other hardware of the hardware layer 804, such as the other hardware illustrated as part of machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures 802 have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers). Wi-Fi® drivers, audio drivers, power management drivers, and so forth, depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system 814 or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™. Windows® Phone, or other mobile operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the machine 900 of FIG. 9, for example). A virtual machine 848 is hosted by a host operating system (operating system 814 in FIG. 9) and typically, although not always, has a virtual machine monitor 846, which manages the operation of the virtual machine 848 as well as the interface with the host operating system (i.e., operating system 814). A software architecture 802 executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Example Machine Architecture and Machine-Readable Medium

Figure 9:
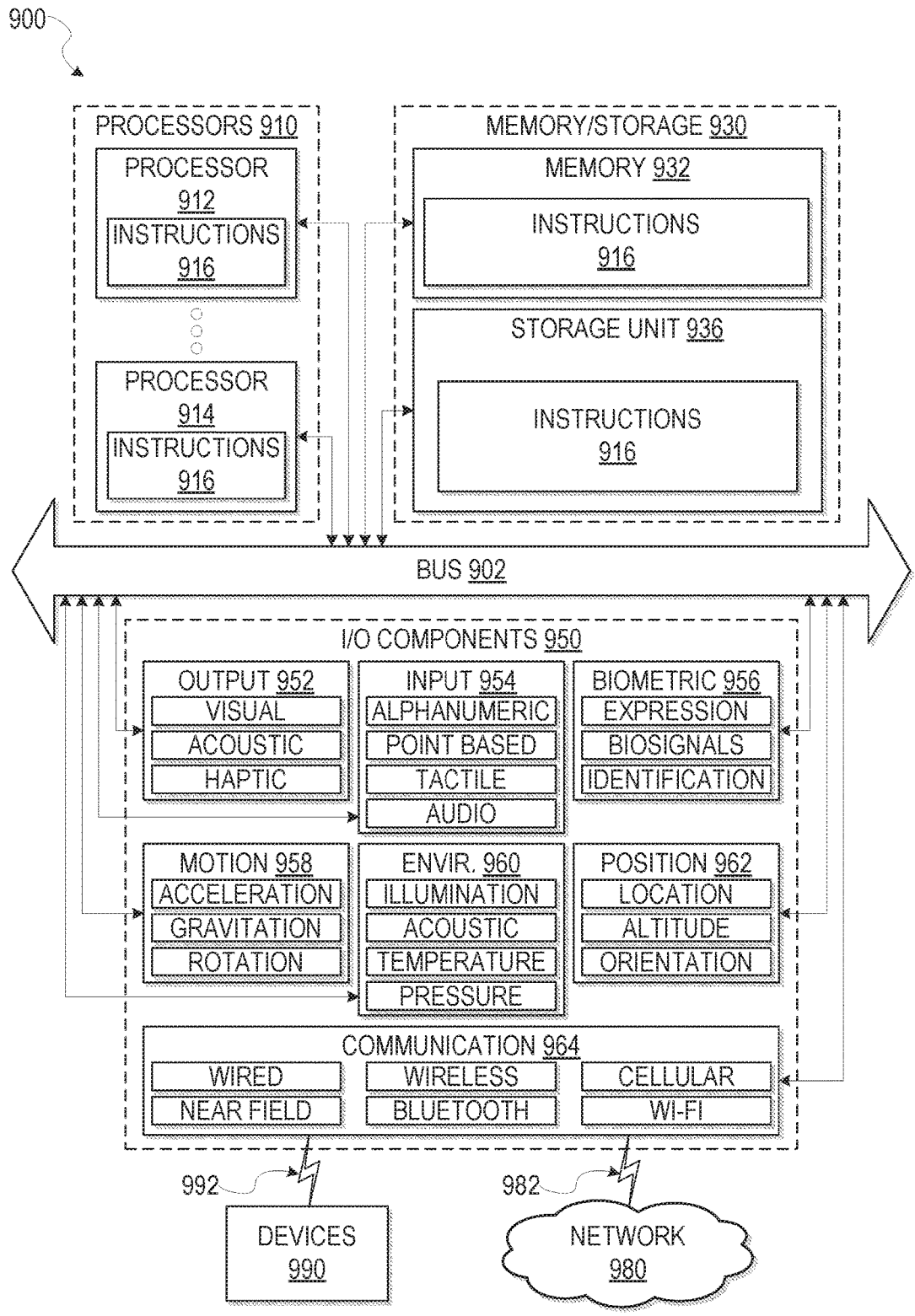
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 916 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagrams of FIGS. 1-7. Additionally, or alternatively, the instructions 916 may implement modules of FIGS. 1-7, and so forth. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 100, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a central processing unit (CPU 102), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 912 and processor 914 that may execute instructions 916. The term "processor" is intended to include multi-core processor 912, 914 that may comprise two or more independent processors 912, 914 (sometimes referred to as "cores") that may execute instructions 916 contemporaneously. Although FIG. 9 shows multiple processors 910, the machine 900 may include a single processor 912, 914 with a single core, a single processor 912, 914 with multiple cores (e.g., a multi-core processor 912, 914), multiple processors 912, 914 with a single core, multiple processors 912, 914 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor 912, 914's cache memory), or any suitable combination thereof, during execution thereof by the machine 900. Accordingly, the memory 932, the storage unit 936, and the memory of processors 910 are examples of machine-readable media.

As used herein. "machine-readable medium" means a device able to store instructions 916 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 990 via coupling 982 and coupling 992 respectively. For example, the communication components 964 may include a network interface component or other suitable device to interface with the network 980. In further examples, communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 990 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 992 (e.g., a peer-to-peer coupling) to devices 990. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A mobile device comprising:
a memory storing an application;
an embedded camera;
a touchscreen display; and
one or more processors coupled with the memory, the embedded camera and the touchscreen display,
wherein the one or more processors are configured to:
execute the application, causing generation of application graphical output in an application layer;
cause rendering of the application layer on the touchscreen display;
generate a viewfinder layer, the viewfinder layer containing real-time image data from the embedded camera via a camera service;
detect a first gesture by a user of the mobile device;
apply, in response to the detection of the first gesture, a transparency mask that identifies a first portion of the touchscreen display to display the application layer and a second portion of the touchscreen display to display the viewfinder layer;
render a composite of the application layer and the viewfinder layer, wherein when the composite is rendered, a portion of the viewfinder layer and a portion of the application layer are separately visible on different portions of the touchscreen display, in accordance with the transparency mask;
detect a second gesture by the user of the mobile device; and
in response to the detection of the second gesture, capture viewfinder data from the viewfinder layer and remove the viewfinder layer, rendering the application layer on the touchscreen display without the viewfinder layer.

2. The mobile device of claim 1, wherein:
the camera service is located in an operating system in the memory; and
the camera service runs in a background.

3. The mobile device of claim 1, wherein the first gesture corresponds to a camera viewfinder punch through effect gesture as defined in a mapping.

4. The mobile device of claim 3, wherein the mapping is modified by the user to alter the first gesture.

5. The mobile device of claim 1, wherein the second gesture corresponds to a photo taking gesture as defined in a mapping.

6. The mobile device of claim 5, wherein the mapping is modified by the user to alter the second gesture.

7. A method comprising:
executing an application on a mobile device, causing generation of application graphical output in an application layer;
rendering the application layer on a touchscreen display of the mobile device;
powering on an embedded camera in the mobile device and generating a viewfinder layer, the viewfinder layer containing real-time image data from the embedded camera via a camera service;
detecting a first gesture by a user of the mobile device;
applying, in response to the detection of the first gesture, a transparency mask that identifies a first portion of the touchscreen display to display the application layer and a second portion of the touchscreen display to display the viewfinder layer;
rendering a composite of the application layer and the viewfinder layer, so that a portion of the viewfinder layer is visible and a portion of the application layer is visible on the touchscreen display at the same time, in accordance with the transparency mask;
detecting a second gesture by the user of the mobile device; and
in response to the detecting of the second gesture, capturing viewfinder data from the viewfinder layer and removing the viewfinder layer, rendering the application layer on the touchscreen display without the viewfinder layer.

8. The method of claim 7, further comprising:
detecting selection of the portion of the viewfinder layer visible on the touchscreen display by the user and movement of the portion of the viewfinder layer by the user; and in response to the detection of selection of the portion of the viewfinder layer visible on the touchscreen display by the user and movement of the portion of the viewfinder layer by the user, modifying the transparency mask to reflect a new location for the portion of the viewfinder layer that is visible on the touchscreen display.

9. The method of claim 7, further comprising:

detecting selection of the portion of the viewfinder layer visible on the touchscreen display by the user and a gesture to enlarge or shrink the portion of the viewfinder layer by the user; and in response to the detection of selection of the portion of the viewfinder layer visible on the touchscreen display by the user and a gesture to enlarge or shrink the portion of the viewfinder layer by the user, modifying the transparency mask to reflect a new size for the portion of the viewfinder layer that is visible on the touchscreen display.

10. The method of claim 7, further comprising:

receiving interaction from the user with the portion of the application layer visible on the touchscreen display; and based on the interaction being with the portion of the application layer visible on the touchscreen display, passing the interaction to the application for handling of the interaction.

11. The method of claim 7, wherein the transparency mask includes an opaque portion and a transparent portion.

12. The method of claim 11, wherein the transparency mask further includes a semi-transparent portion between the opaque portion and the transparent portion.

13. The method of claim 7, wherein the application layer continues to display graphical output from the application while the portion of the viewfinder layer is displayed.

14. A non-transitory computer-readable storage medium comprising instructions that, when executed by at least one processor of a machine, cause the machine to perform operations comprising:

executing an application on a mobile device, causing generation of application graphical output in an application layer;

rendering the application layer on a touchscreen display of the mobile device;

powering on an embedded camera in the mobile device and generating a viewfinder layer, the viewfinder layer containing real-time image data from the embedded camera via a camera service;

detecting a first gesture by a user of the mobile device;

applying, in response to the detection of the first gesture, a transparency mask that identifies a first portion of the touchscreen display to display the application layer and a second portion of the touchscreen display to display the viewfinder layer;

rendering a composite of the application layer and the viewfinder layer, so that a portion of the viewfinder layer is visible and a portion of the application layer is visible on the touchscreen display at the same time, in accordance with the transparency mask;

detecting a second gesture by the user of the mobile device; and in response to the detecting of the second gesture, capturing viewfinder data from the viewfinder layer and removing the viewfinder layer, rendering the application layer on the touchscreen display without the viewfinder layer.

15. The non-transitory computer-readable storage medium of claim 14, wherein the operations further comprise:

detecting selection of the portion of the viewfinder layer visible on the touchscreen display by the user and movement of the portion of the viewfinder layer by the user; and in response to the detection of selection of the portion of the viewfinder layer visible on the touchscreen display by the user and movement of the portion of the viewfinder layer by the user, modifying the transparency mask to reflect a new location for the portion of the viewfinder layer that is visible on the touchscreen display.

16. The non-transitory computer-readable storage medium of claim 14, wherein the operations further comprise:

detecting selection of the portion of the viewfinder layer visible on the touchscreen display by the user and a gesture to enlarge or shrink the portion of the viewfinder layer by the user; and in response to the detection of selection of the portion of the viewfinder layer visible on the touchscreen display by the user and a gesture to enlarge or shrink the portion of the viewfinder layer by the user, modifying the transparency mask to reflect a new size for the portion of the viewfinder layer that is visible on the touchscreen display.

17. The non-transitory computer-readable storage medium of claim 14, wherein the operations further comprise:

receiving interaction from the user with the portion of the application layer visible on the touchscreen display; and passing the interaction to the application for handling of the interaction.

18. The non-transitory computer-readable storage medium of claim 14, wherein the transparency mask includes an opaque portion and a transparent portion.

19. The non-transitory computer-readable storage medium of claim 18, wherein the transparency mask further includes a semi-transparent portion between the opaque portion and the transparent portion.

20. The non-transitory computer-readable storage medium of claim 14, wherein the application layer continues to display graphical output from the application while the portion of the viewfinder layer is displayed.

* * * * *

UNITED STATES PATENT AND TRADEMARK OFFICE
CERTIFICATE OF CORRECTION

PATENT NO. : 9,766,803 B2
APPLICATION NO. : 14/985814
DATED : September 19, 2017
INVENTOR(S) : McCarthy et al.

Page 1 of 1

It is certified that error appears in the above-identified patent and that said Letters Patent is hereby corrected as shown below:

In the Specification

In Column 5, Line 31, delete "102" and insert --100-- therefor

In Column 5, Line 38, delete "118." and insert --100.-- therefor

In Column 5, Line 45, delete "118" and insert --100-- therefor

In Column 7, Line 41, after "circle", insert --.--

In Column 14, Line 31, delete "herein." and insert --herein,-- therefor

Signed and Sealed this
Twenty-eighth Day of May, 2019

Andrei Iancu
*Director of the United States Patent and Trademark Office*